(12) United States Patent
Nagaoka et al.

(10) Patent No.: US 9,032,713 B2
(45) Date of Patent: May 19, 2015

(54) EXHAUST-PIPE INJECTION SYSTEM

(75) Inventors: Daiji Nagaoka, Fujisawa (JP); Teruo Nakada, Fujisawa (JP); Tomohiro Korenaga, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 2 days.

(21) Appl. No.: 13/993,820

(22) PCT Filed: Dec. 7, 2011

(86) PCT No.: PCT/JP2011/078282
§ 371 (c)(1),
(2), (4) Date: Jun. 13, 2013

(87) PCT Pub. No.: WO2012/081462
PCT Pub. Date: Jun. 21, 2012

(65) Prior Publication Data
US 2013/0263581 A1 Oct. 10, 2013

(30) Foreign Application Priority Data
Dec. 16, 2010 (JP) .................................. 2010-280887

(51) Int. Cl.
*F01N 3/00* (2006.01)
*F01N 3/10* (2006.01)
*F01N 3/36* (2006.01)
(52) U.S. Cl.
CPC . *F01N 3/36* (2013.01); *Y02T 10/20* (2013.01); *F02D 2200/0602* (2013.01); *F01N 2610/146* (2013.01)
(58) Field of Classification Search
USPC ........................................... 60/286, 295, 303
See application file for complete search history.

(56) References Cited

U.S. PATENT DOCUMENTS 6,209,315 B1 *  4/2001  Weigl ............................... 60/274
6,810,657 B1  11/2004  Benninger et al.
(Continued)

FOREIGN PATENT DOCUMENTS

DE         19939807     3/2001
DE       102008013406   9/2009
(Continued)

OTHER PUBLICATIONS

Written Opinion of the International Searching Authority mailed Feb. 21, 2012 in corresponding International Application No. PCT/JP2011/078282.
(Continued)

*Primary Examiner* — Thomas Denion
*Assistant Examiner* — Diem Tran
(74) *Attorney, Agent, or Firm* — Staas & Halsey LLP

(57) ABSTRACT

An exhaust-pipe injection system capable of accurately monitoring a lowered injection pressure generated in a fuel line due to exhaust pipe injection and appropriately perform feedback control for the exhaust injection amount. The exhaust-pipe injection system includes: an exhaust pipe injector that injects fuel to an exhaust pipe of an internal combustion engine; a supply pump that sends a fuel to the exhaust pipe injector via a fuel line; a pressure compensating device provided in the vicinity of the exhaust pipe injector of the fuel line; a fuel pressure sensor provided in the fuel line in an upstream side from the pressure compensating device; and an injection control device that adjusts an injection amount of the exhaust pipe injector based on a monitoring value of the fuel pressure sensor.

7 Claims, 3 Drawing Sheets

(56) References Cited

U.S. PATENT DOCUMENTS

| | | | |
|---|---|---|---|
| 6,912,846 B2 * | 7/2005 | Huber et al. | 60/286 |
| 6,935,103 B2 * | 8/2005 | Binder et al. | 60/286 |
| 7,654,080 B2 * | 2/2010 | Ripper et al. | 60/286 |
| 2008/0202102 A1 | 8/2008 | Rodriguez-Amaya et al. | |
| 2011/0047996 A1 | 3/2011 | Garcia-Lorenzana Merino et al. | |

FOREIGN PATENT DOCUMENTS

| | | | |
|---|---|---|---|
| JP | 10-89057 | | 4/1998 |
| JP | 2002-242780 | | 8/2002 |
| JP | 2006-200511 | | 8/2006 |
| JP | 4417878 | | 11/2006 |
| JP | 4561467 | | 11/2006 |
| JP | 2009-503328 | | 1/2009 |
| JP | 2010-203396 | * | 9/2010 |
| JP | 2010-255521 | | 11/2010 |

OTHER PUBLICATIONS

Patent Abstracts of Japan, Japanese Publication No. 10-089057, published Apr. 7, 1998.

Espacenet Abstract, German Publication No. 19939807, published Mar. 1, 2001.

European Patent Office Abstract, German Publication No. 102008013406, published Sep. 17, 2009.

Supplementary European Search Report mailed Sep. 25, 2014 in corresponding European Application No. 11849166.1.

Patent Abstracts of Japan, Publication No. 2002-242780, Published Aug. 28, 2002.

Patent Abstracts of Japan, Publication No. 2006-200511, Published Aug. 3, 2006.

Patent Abstracts of Japan, Publication No. 2010-203396, Published Sep. 16, 2010.

Patent Abstracts of Japan, Publication No. 2010-255521, Published Nov. 11, 2010.

Patent Abstracts of Japan, Publication No. 2006-316757, Published Nov. 24, 2006.

Patent Abstracts of Japan, Publication No. 2006-316758, Published Nov. 24, 2006.

International Search Report of PCT/JP2011/078282 mailed Feb. 21, 2012.

* cited by examiner (a) (b)

EXHAUST-PIPE INJECTION SYSTEM

CROSS-REFERENCE TO RELATED APPLICATIONS

This application claims the foreign priority benefit of Japanese Patent Application No. 2010-280887 filed Dec. 16, 2010, the contents of which are incorporated herein by reference, which serves as priority for PCT Application No. JP2011/078282 filed Dec. 7, 2011.

TECHNICAL FIELD

The present invention relates to an exhaust-pipe injection system for adding unburned fuel to an exhaust gas of an internal combustion engine, and more particularly, to an exhaust-pipe injection system that performs feedback control for an exhaust injection amount.

BACKGROUND ART

In recent years, in order to purify environmental pollutants contained in an exhaust gas from an engine, an exhaust gas purifier system having a diesel particulate filter (DPF) unit, a lean NOx trap (LNT) unit, and the like provided in an exhaust pipe has been developed. In such an exhaust gas purifier system, the unburned fuel is added to the exhaust gas, and the exhaust gas is heated by oxidizing and burning the fuel using an oxidation catalyst, so that the purifier is regenerated using the exhaust gas having a high temperature.

As a means for adding the unburned fuel to the exhaust gas, exhaust pipe injection attracts interest, in which exhaust gas recirculation (EGR) control can be applied even when a fuel is added, and a fuel consumption necessary to increase a temperature is suppressed to a low value without generating oil dilution in an engine cylinder. The exhaust pipe injection is a method of adding unburned fuel to the exhaust gas from the exhaust pipe injector provided in the exhaust pipe (for example, refer to Patent Documents 1 and 2)

FIG. 4 illustrates a configuration of the exhaust pipe injection system in the related art.

The exhaust-pipe injection system 41 that performs exhaust pipe injection includes a supply pump 12 for pressurizing and sending a fuel, a fuel filter 13 for removing impurities mixed in the fuel, a common-rail injection system 14 that accumulates the pressurized fuel, an in-cylinder injector 15 that injects the fuel accumulated in the common-rail injection system 14 into the inside of the engine cylinder, and an exhaust pipe injector 16 that injects the fuel obtained by removing impurities using the fuel filter 13 into the exhaust pipe.

In the exhaust-pipe injection system 41, the fuel supplied from the fuel tank to the supply pump 12 via a supply line 17 is primarily pressurized and is sent by the supply pump 12, so that the pressurized fuel passes through a primary pressurizing line 18 and the fuel filter 13 provided in the primary pressurizing line 18 and flows to the supply pump 12 again.

The supply pump 12 is driven by a crankshaft of an engine.

The fuel flowing to the supply pump 12 again is secondarily pressurized and is sent by the supply pump 12. The pressurized fuel passes through the secondary pressurizing line 19 and is accumulated in the common-rail injection system 14.

The high-pressure fuel accumulated in the common-rail injection system 14 is injected into the inside of the engine cylinder from the in-cylinder injector 15 via a fuel injection line 20 and is consumed for an engine combustion operation.

A surplus fuel unconsumed in the in-cylinder injector 15 and a surplus fuel in the common-rail injection system 14 are returned from return lines 21 and 22 and are discharged to the fuel tank from a discharge line 23 connected to the return lines 21 and 22.

A part of the fuel passing through the fuel filter 13 is split to a fuel line 24 connected to a downstream side of the primary pressurizing line 18 and is supplied to the exhaust pipe injector 16 via the fuel line 24. In the fuel filter 13, a fuel pressure sensor 25 for monitoring an injection pressure in exhaust pipe injection is provided in an upstream side from a filter unit (not illustrated) in the fuel filter 13.

The in-cylinder injector 15, the exhaust pipe injector 16, and the fuel pressure sensor 25 are connected to an electronic control unit (ECU) 26. The ECU 26 controls the in-cylinder injector 15. The ECU 26 includes an injection control device 27 that adjusts an exhaust injection amount of the fuel by controlling an open/close operation of the exhaust pipe injector 16 based on a monitoring value of the fuel pressure input from the fuel pressure sensor 25 and a desired injection amount.

In this exhaust-pipe injection system 41, exhaust pipe injection is performed by driving the exhaust pipe injector 16 based on a duty ratio. The duty ratio refers to a ratio of an open time (injection time) of the exhaust pipe injector 16 per unit time. The injection amount (exhaust injection amount) from the exhaust pipe injector 16 is adjusted by controlling the duty ratio of the exhaust pipe injector 16.

When the fuel is injected from the exhaust pipe injector 16 to the exhaust pipe, an internal pressure of the fuel line 24 tends to temporarily decrease so as to reduce the exhaust injection amount. This is caused by a balance between a fuel supply of the supply pump 12 and a fuel reduction caused by the injection. In particular, this tendency becomes significant when an engine revolution is low, and an in-cylinder injection amount is large (low revolution and high torque) because the fuel supply amount of the supply pump 12 is small, and the fuel injection amount of the engine is large. Therefore, it is necessary to monitor the injection pressure of exhaust pipe injection (fuel pressure in the fuel line 24) and correct a reduction of the injection amount caused by the lowered pressure by increasing the duty ratio.

Typically, the exhaust injection amount is controlled using a 3-dimensional map (typically, called a BP map) in which an injection characteristic of the exhaust pipe injector 16 is expressed using a duty ratio for the injection pressure and the injection amount (that is, the exhaust injection amount is controlled by determining the duty ratio of the exhaust pipe injector 16 with reference to the BP map using the injection pressure and the desired injection amount). It is desirable that the injection pressure is measured by arranging the fuel pressure sensor in an exhaust injection path as close to the exhaust pipe injector 16 as possible. This is because a pressure fluctuation in the vicinity of the exhaust pipe injector 16 affects a change of the exhaust injection amount.

PRIOR ART DOCUMENTS

Patent Document 1: Japanese Patent No. 4417878
Patent Document 2: Japanese Patent No. 4561467

However, in the vicinity of the exhaust pipe injector 16, a pressure pulsation is generated in the fuel line 24 due to the duty operation (that is, open/close operation of the exhaust pipe injector 16) at the time of injection. Therefore, if pressure feedback control (FB control) is performed to correct the injection amount based on this value, a deviation in a change of the injection amount further increases, so that the injection amount is not stabilized.

In order to avoid such a problem, in the exhaust-pipe injection system 41 of the related art, the fuel pressure sensor 25 is arranged in an upstream side from the filter unit of the fuel filter 13. In this configuration, due to a buffering effect of the fuel filter 13, it is possible to reduce influence of the pressure pulsation of the fuel line 24 caused by exhaust pipe injection. However, since a fuel pressure measurement position is separated from the exhaust pipe injector 16, it is difficult to accurately measure the lowered injection pressure at the time of injection and appropriately perform pressure FB control for the exhaust injection amount.

SUMMARY OF THE INVENTION

In view of the aforementioned problems, the present invention provides an exhaust-pipe injection system capable of appropriately performing feedback control for an exhaust injection amount by monitoring a lowered injection pressure generated in a fuel line due to exhaust pipe injection.

In order to achieve the above object, the present invention is an exhaust-pipe injection system including: an exhaust pipe injector that injects fuel to an exhaust pipe of an internal combustion engine; a supply pump that sends fuel to the exhaust pipe injector via a fuel line; a pressure compensating device provided in the vicinity of the exhaust pipe injector of the fuel line; a fuel pressure sensor provided in the fuel line in an upstream side from the pressure compensating means; and an injection control device that adjusts an injection amount of the exhaust pipe injector based on a monitoring value of the fuel pressure sensor.

It is preferred that the pressure compensating device suppresses a fluctuation in the monitoring value of the fuel pressure sensor caused by an open/close operation of the exhaust pipe injector.

It is preferred that the injection control device adjusts the injection amount of the exhaust pipe injector by controlling an open time of the exhaust pipe injector.

It is preferred that the injection control device adjusts the injection amount of the exhaust pipe injector based on the monitoring value of the fuel pressure sensor to correct a reduction of the injection amount caused by a lowered fuel pressure of the fuel line.

It is preferred that the pressure compensating device includes a buffer tank.

It is preferred that the pressure compensating device includes an accumulator.

According to the present invention, it is possible to provide an exhaust-pipe injection system capable of appropriately performing feedback control for an exhaust injection amount by accurately monitoring a lowered injection pressure generated in a fuel line due to exhaust pipe injection.

BRIEF DESCRIPTION OF THE DRAWINGS

FIGS. 2A and 2B are diagrams illustrating a fluctuation in the fuel pressure when the exhaust pipe injector is opened or closed, in which FIG. 2A illustrates a fluctuation in the fuel pressure of the exhaust-pipe injection system according to the present invention, and FIG. 2B illustrates a fluctuation in the fuel pressure of an exhaust-pipe injection system obtained by arranging a fuel pressure sensor in the vicinity of the exhaust pipe injector without providing a pressure compensating device.

DETAILED DESCRIPTION

Hereinafter, exemplary embodiments of the present invention will be described with reference to the accompanying drawings.

Figure 1:
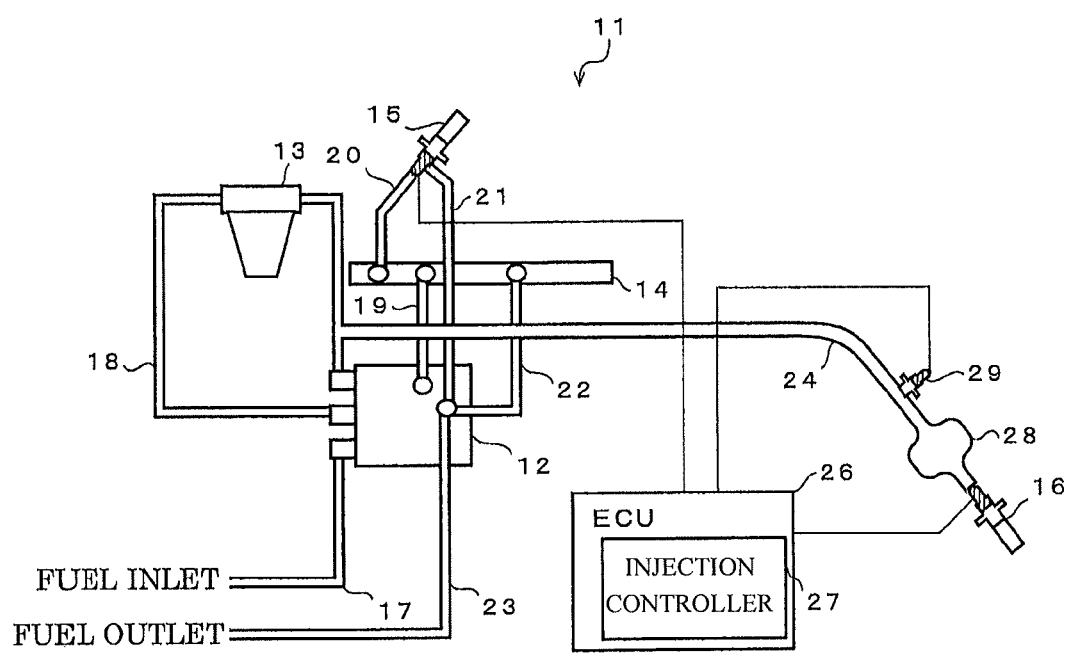
FIG. 1 is a schematic diagram illustrating a configuration of an exhaust-pipe injection system according to an embodiment of the present invention.

FIG. 1 is a schematic diagram illustrating a configuration of an exhaust-pipe injection system according to an exemplary embodiment of the present invention.

The exhaust-pipe injection system 11 according to the this embodiment has basically the same structure as that of the exhaust-pipe injection system 41 of the related art. Therefore, like reference numerals denote like elements, and description thereof will not be repeated.

In the exhaust-pipe injection system 11, a pressure compensating device 28 is provided in the vicinity of the exhaust pipe injector 16 of the fuel line 24, and a fuel pressure sensor 29 is provided in the fuel line 24 in the upstream side from the pressure compensating device 28. The pressure compensating means 28 is provided to suppress a pulsation in the fuel line 24 caused by the open/close operation (duty operation) of the exhaust pipe injector 16 and a fluctuation in the monitoring value of the fuel pressure sensor 29. According to the present embodiment, the pressure compensating device 28 includes a buffer tank. The buffer tank has a minimum necessary capacity (for example, approximately 200±100 cc) such that a pulsation component in the fuel line 24 can be absorbed, and an average value of the pressure reduction amount at the time of injection is not changed.

The ECU 26 is connected to the in-cylinder injector 15, the exhaust pipe injector 16, and the fuel pressure sensor 29. In addition, an injection control device 27 integrated into the ECU 26 adjusts an injection amount of the exhaust pipe injector 16 by controlling an open time of the exhaust pipe injector 16 based on the monitoring value of the fuel pressure sensor 29.

More specifically, the injection control device 27 determines a duty ratio of the exhaust pipe injector 16 with reference to a BP map using a monitoring value of the fuel pressure sensor 29 and a desired injection amount output by the ECU 26 and adjusts the injection amount of the exhaust pipe injector 16 by controlling the open time of the exhaust pipe injection injector 16 based on the determined duty ratio. In addition, the injection control device 27 performs pressure feedback (FB) control for the injection amount based on the monitoring value of the fuel pressure sensor 29 such that, when the fuel pressure (injection pressure) in the fuel line 24 is lowered due to injection of the exhaust pipe injector 16, a reduction of the injection amount caused by the lowered fuel pressure is corrected by changing the duty ratio and controlling the open time of the exhaust pipe injector 16 with reference to the BP map using the monitoring value of the lowered fuel pressure and the desired injection amount.

Figure 2:
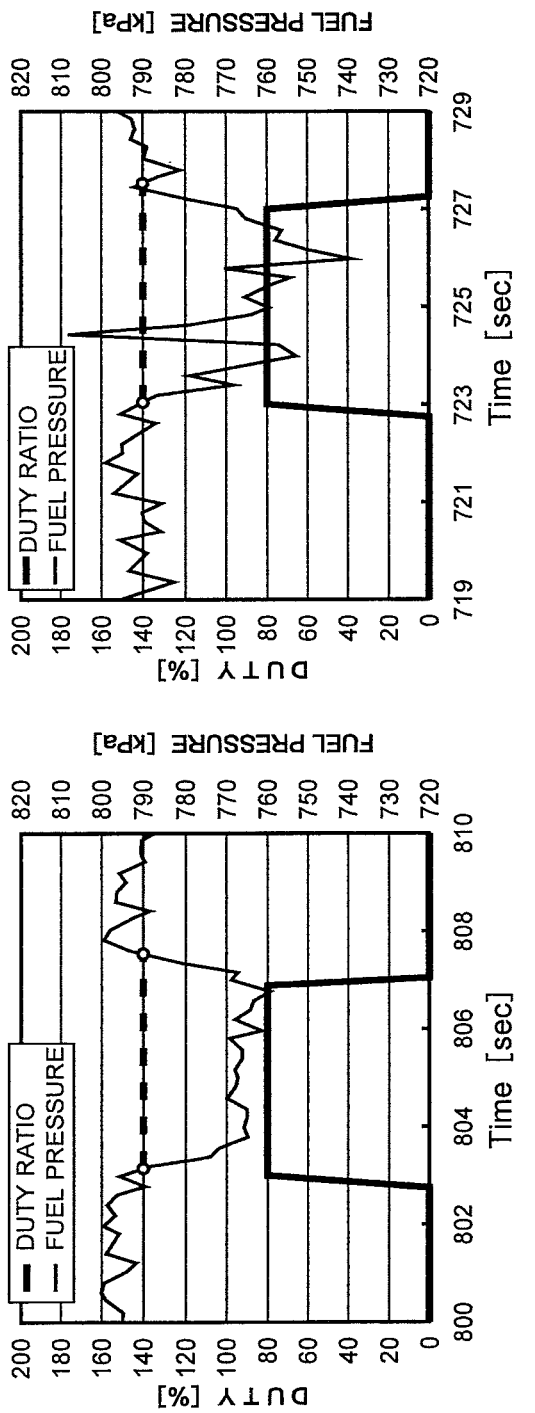

Next, effects of the present invention will be described with reference to FIG. 2.

FIGS. 2A and 2B are diagrams illustrating a fluctuation in the fuel pressure of the open/close operation of the exhaust pipe injector 16, in which FIG. 2A illustrates a fluctuation in the fuel pressure of the exhaust-pipe injection system 11 according to the present invention, and FIG. 2B illustrates a fluctuation in the fuel pressure of the exhaust-pipe injection system having the fuel pressure sensor 29 in the vicinity of the exhaust pipe injector 16 without providing the pressure compensating device 28. Here, a change of the monitoring value (fuel pressure) of the fuel pressure sensor 29 during the exhaust pipe injection is illustrated while the exhaust pipe injector 16 is opened/closed (in a period indicated by a dotted line in the drawing) by setting the duty ratio of the exhaust pipe injector 16 to 80%.

As illustrated in FIGS. 2A and 2B, when the exhaust pipe injector 16 is closed without performing exhaust pipe injection, a pulsation component caused by the supply pump 12 is detected by the fuel pressure sensor 29 regardless of whether or not the pressure compensating device 28 is provided.

When exhaust pipe injection starts, and the exhaust pipe injector 16 is opened/closed, in the exhaust-pipe injection system having the fuel pressure sensor 29 arranged in the vicinity of the exhaust pipe injector 16 without providing the pressure compensating means 28, the monitoring value of the fuel pressure sensor 29 is influenced by a pressure pulsation in the fuel line 24 caused by the open/close operation of the exhaust pipe injector 16. Therefore, pressure FB control is not appropriately performed, a fluctuation of the fuel pressure during the exhaust pipe injection increases as illustrated in FIG. 2B, and a deviation in a change of the injection amount increases, so that it is difficult to stabilize the injection amount.

Meanwhile, in the exhaust-pipe injection system 11 according to the present embodiment, using the pressure compensating device 28 (buffer tank), it is possible to suppress the pressure pulsation caused by the open/close operation of the exhaust pipe injector 16 from influencing a fluctuation of the monitoring value of the fuel pressure sensor 29. Therefore, it is possible to appropriately perform pressure FB control, suppress the fuel pressure during the exhaust pipe injection as illustrated in FIG. 2A, and stabilize the injection amount.

The average fuel pressure monitored by the fuel pressure sensor 29 during exhaust pipe injection is represented in Table 1.

TABLE 1

| | | Average fuel pressure [kPa] |
|---|---|---|
| Buffer tank | Provided | 768.4 |
| | Not provided | 767.1 |

As recognized from Table 1, the average fuel pressure during exhaust pipe injection in the exhaust-pipe injection system 11 having the pressure compensating device 28 (buffer tank) is approximately equal to that of the exhaust-pipe injection system having no pressure compensating device 28. That is, it is conceived that the exhaust-pipe injection system 11 can perform pressure FB control for the injection amount by suppressing only the pulsation component of the fuel line 24 and stabilize the injection amount.

In summary, in the exhaust-pipe injection system 11 having a simple and inexpensive configuration according to the present embodiment, it is possible to suppress a pressure fluctuation in the fuel line 24 caused by the open/close operation of the exhaust pipe injector 16 using the pressure compensating device 28 and accurately monitor the fuel pressure of the fuel line 24 using the fuel pressure sensor 29 provided in the vicinity of the exhaust pipe injector 16 while a pressure fluctuation is suppressed.

In addition, when the fuel pressure (injection pressure) in the fuel line 24 is lowered due to injection from the exhaust pipe injector 16, it is possible to accurately monitor the lowered injection pressure, appropriately perform pressure FB control for the exhaust injection amount, and correct a reduction of the injection amount caused by the lowered injection pressure.

As a result, it is possible to improve a temperature stability to regenerate a DPF unit or an LNT unit or a stability of a λ-value (exhaust gas air-fuel ratio) at the time of desulfurization control by controlling a temperature of the exhaust gas.

In addition, it is possible to handle a driving condition change of an internal combustion engine or a change of the injection pressure caused by degradation of the exhaust pipe injector 16.

The present invention is not limited to the aforementioned embodiment. For example, an accumulator may be provided as the pressure compensating device 28 instead of the buffer tank.

Figure 3:
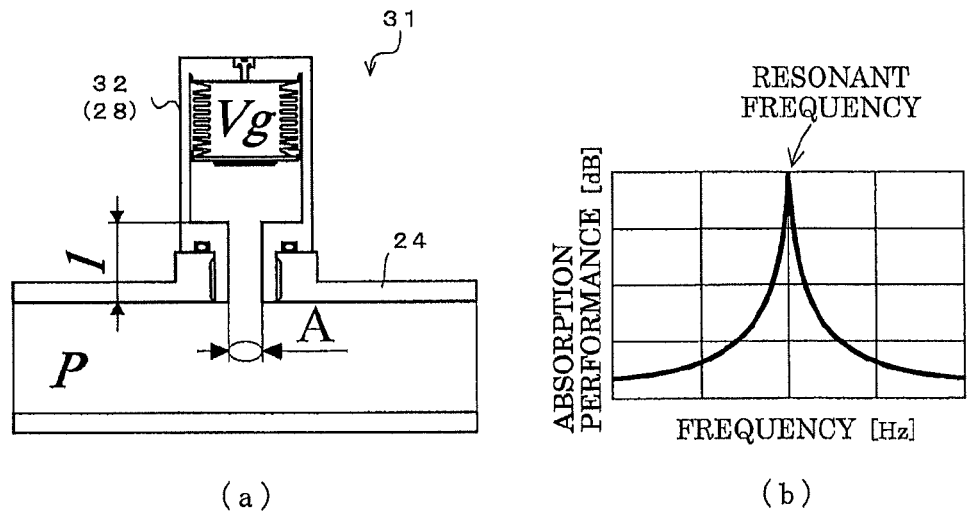
FIG. 3A is a partially cross-sectional view illustrating a configuration of the exhaust-pipe injection system according to another embodiment of the present invention.
FIG. 3B is a diagram illustrating a characteristic of an accumulator.
Figure 4:
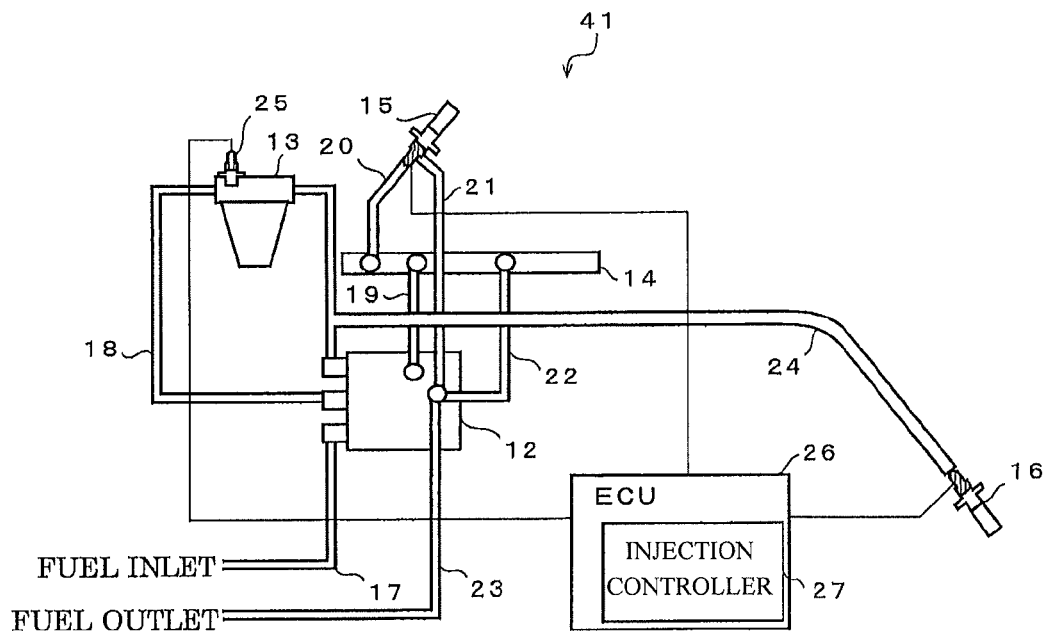
FIG. 4 is a schematic diagram illustrating a configuration of an exhaust injection system in the related art.

FIG. 3A is a partially cross-sectional view illustrating an exhaust-pipe injection system 31 having an accumulator 32 provided in the vicinity of the exhaust pipe injector 16 of the fuel line 24 as the pressure compensating device 28.

The accumulator 32 has a maximum absorption capability for a pulsation when the frequency thereof is equal to the pulsation frequency (resonant frequency) of the fuel line 24 as illustrated in FIG. 3B. For this reason, the pulsation frequency of the fuel line 24 is previously measured, and the accumulator 32 is designed based on the following Equation (1) such that the pulsation frequency is equal to the frequency f of the accumulator 32.

[Equation 1]

where n denotes a polytropic index (n=1.4),
P denotes a pressure of the port entrance [MPa],
A denotes a cross-sectional area of the port [mm2],
ρ denotes an oil density [N/mm4-s2] (p=8.7×1010),
I denotes a length of the port [mm], and
Vg denotes a gas volume of the accumulator in operation [cm3].

In this manner, in the exhaust-pipe injection system 31 according to the present embodiment, it is possible to obtain excellent effects similar to those of the exhaust-pipe injection system 11 described above.

The invention claimed is:

1. An exhaust-pipe injection system comprising:
   an exhaust pipe injector that injects an amount of fuel into an exhaust pipe of an internal combustion engine;
   a fuel tank;
   a fuel filter for removing impurities from the fuel;
   a supply pump for pressurizing the fuel supplied from the fuel tank,
   a common-rail injection system;
   a primary pressurizing line in which the pressurized fuel is supplied from the supply pump, passes through the fuel filter and flows back to the supply pump;
   a secondary pressurizing line in which the fuel flows from the supply pump to the common-rail injection system;
   an in-cylinder injector that injects fuel from the common-rail injection system into an engine cylinder;
   a fuel line that directs some of the fuel that has been filtered by the fuel filter to the exhaust pipe injector;
   a pressure compensating device provided in the vicinity of the exhaust pipe injector to suppress a fluctuation in a fuel pressure within the fuel line caused by fuel injection by the exhaust pipe injector;

a fuel pressure sensor provided in the fuel line in an upstream side from the pressure compensating device; and an injection control device that adjusts the amount of the fuel injected by the exhaust pipe injector by controlling an open/close operation of the exhaust pipe injector based on a monitoring value of the fuel pressure sensor.

2. The exhaust-pipe injection system according to claim 1, wherein the pressure compensating device suppresses a fluctuation in the monitoring value of the fuel pressure sensor due to an open/close operation caused by duty control of the exhaust pipe injector.

3. The exhaust-pipe injection system according to claim 1, wherein the injection control device adjusts the injection amount of the exhaust pipe injector based on the monitoring value of the fuel pressure sensor to correct a reduction of the injection amount caused by a lowered fuel pressure of the fuel line.

4. The exhaust-pipe injection system according to claim 1, wherein the pressure compensating device is a buffer tank.

5. The exhaust-pipe injection system according to claim 1, wherein the pressure compensating device is an accumulator.

6. The exhaust-pipe injection system according to claim 1, wherein the injection control device adjusts the injection amount of the exhaust pipe injector by controlling an amount of time that the exhaust pipe injector remains open.

7. The exhaust-pipe injection system according to claim 6, wherein the injection control device adjusts the injection amount of the exhaust pipe injector based on the monitoring value of the fuel pressure sensor to correct a reduction of the injection amount caused by a lowered fuel pressure of the fuel line.

* * * * *